United States Patent [19]

Oppenheim

[11] Patent Number: 5,734,905
[45] Date of Patent: Mar. 31, 1998

[54] USER INTERFACE IN OBJECT ORIENTED COMPUTER SYSTEM FOR PERFORMING INTUITIVE OBJECT TRANSFORMATIONS

[75] Inventor: Daniel V. Oppenheim, Stanford, Calif.

[73] Assignee: Board of Trustees of the Leland Stanford Junior University, Stanford, Calif.

[21] Appl. No.: 422,604

[22] Filed: Apr. 11, 1995

Related U.S. Application Data

[63] Continuation of Ser. No. 58,293, May 6, 1993, abandoned.

[51] Int. Cl.⁶ .................................................. G06F 3/153
[52] U.S. Cl. ..................................................... 395/683
[58] Field of Search ................................. 395/700, 157, 395/159, 683, 680, 335, 348, 339

[56] References Cited

U.S. PATENT DOCUMENTS

| | | | |
|---|---|---|---|
| 4,686,522 | 8/1987 | Hernandez et al. | 395/709 |
| 4,899,136 | 2/1990 | Beard et al. | 340/706 |
| 4,939,507 | 7/1990 | Beard et al. | 340/706 |
| 5,079,695 | 1/1992 | Dysart et al. | 395/700 |
| 5,121,478 | 6/1992 | Rao | 395/157 |
| 5,214,756 | 5/1993 | Franklin et al. | 395/159 |
| 5,265,206 | 11/1993 | Schackelford et al. | 395/200 |
| 5,301,268 | 4/1994 | Takeda | 395/157 |
| 5,315,703 | 5/1994 | Matheny et al. | 395/164 |
| 5,327,529 | 7/1994 | Fults et al. | 395/155 |
| 5,367,635 | 11/1994 | Bauer et al. | 395/700 |
| 5,367,681 | 11/1994 | Foss et al. | 395/650 |
| 5,386,564 | 1/1995 | Shearer et al. | 395/650 |
| 5,386,568 | 1/1995 | Wold et al. | 395/700 |
| 5,404,442 | 4/1995 | Foster et al. | 395/159 |
| 5,421,015 | 5/1995 | Khoyi et al. | 395/650 |
| 5,428,734 | 6/1995 | Haynes et al. | 395/154 |
| 5,579,521 | 11/1996 | Shearer et al. | 395/680 |
| 5,629,846 | 5/1997 | Crapo | 395/785 |

OTHER PUBLICATIONS

K. P. Welch, "Interprogram Communications Using Window's Dynamic Date Exchange", Microsoft System Journal, Nov. 30, 1987.

J. M. Richter, Windows 3.1: A Developer's Guide, second edition, M&T Books, chapter 9, 1992.

K. Panov, L. Salomon, Jr., A. Panov, The Art of OS/2 2.1 C Programming, John Wiley & Sons, Inc., Chapter 18, 1993.

Employees of Microsoft; "Ole", Various Pages.

Employees of Zinc Software, Inc., "Zinc Interface Library Programmer's Guide", Various Pages; 1990–1992.

The Macintosh Operating System; "Mac World"; 1989, Apr., p. 151.

*Primary Examiner*—Alvin L. Oberley
*Assistant Examiner*—Sue Lao
*Attorney, Agent, or Firm*—Gary S. Williams; Flehr Hohbach Test Albritton & Herbert LLP

[57] ABSTRACT

A computer system having an object oriented operating system utilizes a user interface that includes a display and user command input apparatus. Objects data structures are stored in the computer system's memory, each object having an associated image that can be displayed, and an assigned object type. Furthermore, each object can access a corresponding communication interface for the purpose of exchanging messages with other objects. The computer system's user enables a user to select a first object to be used as a transformer object and to select a second object as a transformee object. Once the transformer and transformee objects have been selected, the communication interfaces of the transformer and transformee objects exchange messages so as to determine, based on the object types of the transformer and transformee objects, a transformation action to be performed on the transformee object, and then the transformation action is performed so as to produce a transformed object. Some objects are capable of more than one type of transformation on other objects, and when such objects are used to perform a transformation the transformation selection process may include requesting the user to select one of the available transformations. The computer system may include objects that extract preselected characteristics of other objects so as to create operator objects. Such operator objects can modify other objects so as to include the extracted preselected characteristics. Data filters are a type of operator object. Another type of object transformation that can be performed is the linking of two objects to each other on an ongoing basis.

11 Claims, 6 Drawing Sheets

USER INTERFACE IN OBJECT ORIENTED COMPUTER SYSTEM FOR PERFORMING INTUITIVE OBJECT TRANSFORMATIONS

This is a file wrapper continuation of application Ser. No. 08/058,293 filed May 6, 1993 now abandoned.

The present invention relates generally to the user interfaces of object oriented computer systems, and more specifically to a system and method for enabling users of such computer systems to transform a first specified object using a process represented by a second object.

BACKGROUND OF THE INVENTION

The present invention is designed to allow non-technically oriented users of computer systems to easily and intuitively perform highly complicated tasks that would otherwise not be possible without the use of expert programming skills. In particular, the present invention provides a mechanism that allows completely distinct application programs to communicate with another, thereby allowing the user to configure an application program to his needs. The present invention also provides a mechanism for linking two or more unrelated application programs together in an ongoing manner, thereby allowing the output of one application program to automatically flow into another application program as its input.

The goal of the present invention can be viewed as making it easy for computer users to apply a variety of distinct application programs to an object or a set of objects in an intuitive manner and without having to concern themselves with the mechanics of moving data from one application program to another.

Certain individual application programs provide mechanisms for successively modifying an object with various operators, and for making various versions of an object. For instance many drawing application programs, such as MacDraw Pro published by Claris (a registered trademark of Apple Computer) or Freehand (a registered trademark of Aldus Corporation) published by Aldus provide built in functions for tasks such as smoothing objects and rotating objects, and for converting a set of objects into various data representations for export to other programs. However, it is generally much more difficult to perform a sequence of tasks on an object using several different application programs.

For instance, if we consider an object that contains a musical score, one application program might be best for changing the key in which the score or a portion of the score is written, while a second application program might be best for modifying the rhythm of the score or for adding special sound effects, and a third application might be best for filtering the score (or a corresponding sound file) with a specified function in either the time or frequency domains. Moving the musical score from one application program to the next to accomplish some combination of these functions, especially if the application programs are published by different companies and not written to facilitate movement therebetween, can be so time consuming and difficult that it negatively impacts on the user's creativity.

From another perspective, consider the situation in which a person likes the way a first application program performs a first function, likes the way a second application program performs a second function, and so on. If the person wants to perform a series of these functions on a particular object, the person will often have to perform many time consuming operations in order to convert or transform the object so that it is suitable for use with these application programs.

One solution to the above problem that pre-dates the present invention is the use of a "clipboard" to which items of data can be written by one program, and then read by a second program. If the type of data in the clipboard is compatible with the second program, it will then process that data in its normal fashion; if the type of data in the clipboard is not compatible, the second program will generally notify the user of that fact.

The Next operating system, used on computers made by Next, Inc., provides two improvements on the basic clipboard mechanism. Both improvements provide automatic conversion of data from one representation to another so that a program reading data from another program can receive that data in a preferred representation. The first improvement provided by the Next OS works as follows: when an application writes data to the clipboard, it provides the clipboard's server (a program that maintains the clipboard) a list of all the different representations of the pasted data that it could provide, if requested. The clipboard also keeps a pointer back to the application that wrote the data into the clipboard. When another application attempts to import the data in the clipboard, it receives from the clipboard the list of different data representations that are available, selects the one it wants, and then asks the clipboard to pass it the data in that representation. If the data in the clipboard is currently written in a different representation than the one requested, the clipboard calls back to the application that wrote the data to get that data in the requested representation, and then passes the data in the requested representation to the requesting application.

The second improvement on the basic clipboard provided by the Next OS is called the Drag-and-Drop server. Windows can register with the Drag-and-Drop server when the windows are opened, and part of the registration process is to provide the Drag-and-Drop server with a list of the all the data types accepted by that window. The Drag-and-Drop server can access "filters" that can convert data from one representation to another. By using a mouse pointer device to select and move data, the user can clip some data from one application, drag it to another window, and drop the data into the new window as long as both windows are registered with the Drag-and-Drop server. If the receiving window is registered, but does not accept the data type of the data being dropped on it, the Drag-and-Drop server will still deliver the data to the receiving window if there is an available filter that will convert the data to a data type acceptable to the receiving window (as represented in the window's registration). Otherwise the Drag-and-Drop server will abort the data delivery and notify the user of the reason for that action.

The improvements to the clipboard described above enable automatic data conversions when transferring data from one application program to another.

Another extension of the clipboard concept found in some applications is called object link embedding (OLE). When two applications support OLE, part of a document from one application can be embedded in a document from the other application. For instance, part of spreadsheet can be embedded in a word processing program document. Changes made to the embedded spread sheet while running the word processing program invoke the spread sheet program by way of the link. Changes made to the embedded spreadsheet made in either application show up in the other application.

While the above improvements to the clipboard feature of certain operating systems are very useful, they are limited to facilitating the transfer of data from one application to another. What the described systems do not provide is a methodology for two applications to interact or for objects within different applications to interact.

For instance, moving data from one application to another does not provide a convenient mechanism for extracting desired characteristics of one object, such as extracting the "style" of a document, and then imposing those characteristics on another object. Examples of other "extract" and "transform" procedures that would be helpful to computer users are: extracting the rhythm from one piece of music, and then imposing it on another piece of music; extracting the acoustic frequency spectrum of a piece of music in the form of an FFT filter, and them using that FFT filter to modify other pieces of music.

Another example of what the improved clipboards do not provide is the ability to easily link objects within different application programs together for ongoing computations. For instance, a user might want to connect an input port of his/her computer to an analog-to-digital data conversion program, and then want to connect the output from the conversion program to a particular variable or port of another program. Making such connections between different application programs, especially if the application programs were not specifically written to be used together, is generally something that requires considerable programming expertise when using current computers.

It is a goal of the present invention to make it possible for non-programmers to cause separate application programs to interact in ways that are intuitive and useful.

SUMMARY OF THE INVENTION

In summary, the present invention is a methodology for modifying objects with other objects in a computer system having an object oriented operating system and a user interface that includes a display for displaying images and input apparatus for enabling a user to enter commands and to move displayed images. Objects data structures are stored in the computer system's memory, each object having an associated image that can be displayed. Each object also can access a corresponding communication interface for communicating with other objects, and each object has an assigned object type.

The computer system's user interface responds to user commands, and enables a user to select a first object to be used as a transformer object and to select a second object as a transformee object. Once the transformer and transformee objects have been selected, the communication interfaces of the selected transformer and transformee objects exchange messages so as to determine, based on the object types of the transformer and transformee objects, a transformation action to be performed on the transformee object, and then the transformation action is performed so as to produce a transformed object. The transformed object may be either a new object or a revised version of the transformee object.

Some objects are capable of more than one type of transformation on other objects, and when such objects are used to perform a transformation the transformation selection process may include requesting the user to select one of the available transformations. In a preferred embodiment the computer system includes transformer objects that extract preselected characteristics of other objects so as to create operator objects. Such operator objects can then be used to modify other objects so as to include the extracted preselected characteristics. Other operator objects that can be used in the preferred embodiment include data filters.

Another type of object transformation that can be performed using the present invention is the linking of two objects to each other on an ongoing basis, typically so that data will flow into one of the linked objects and then the resulting flow of output data is used as input data for the other of the linked objects.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

Figure 1:
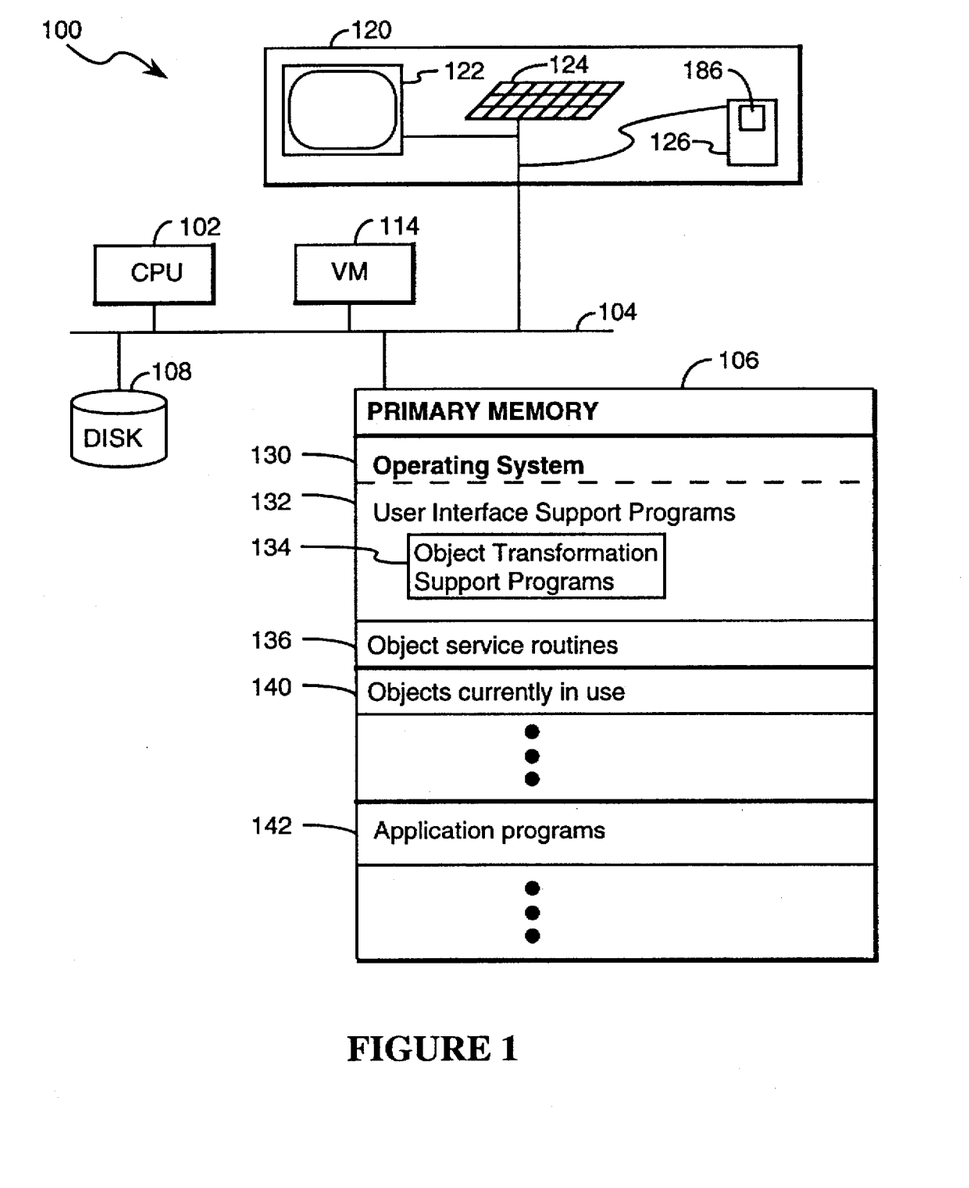
FIG. 1 is a block diagram of a computer system incorporating the present invention.

Referring to FIG. 1, there is shown a computer system 100 having a central processing unit 102 coupled by communications bus 104 to primary memory (i.e., high speed, random access memory) 106, secondary memory (e.g., magnetic disks) 108, a virtual memory controller 114, and a user interface 120. The user interface 120 typically includes a display or monitor 122, user input devices such as a keyboard 124 and mouse pointer device 126, and may also include other input and output devices not shown here.

Stored in the memory 106 and/or 108 is the computer system's operating system 130, which generally must be an object oriented computer operating system such as the Macintosh operating system, the Next operating system or Windows NT. The present invention can be implemented either by (A) modifying the user interface support programs 132 and object structures of the operating system, or (B) by building the features of the present invention into user interface support programs that run on top of the operating system. We will call the software added by the present invention the object transformation support programs 134.

The operating system 130 also generally will include various object service routines 136 for performing operations such as creating instances of objects, allocating memory storage for objects, controlling access to objects, reallocating space occupied by deleted objects, and so on. Alternately, application programs may perform these functions.

A portion of primary memory is occupied by the objects 140 currently in use by the user or users of the computer system 100. Another portion of primary memory 106 is generally occupied by the application programs 142 currently in use.

Object Data Structure and Object Transform Interface

Figure 2:
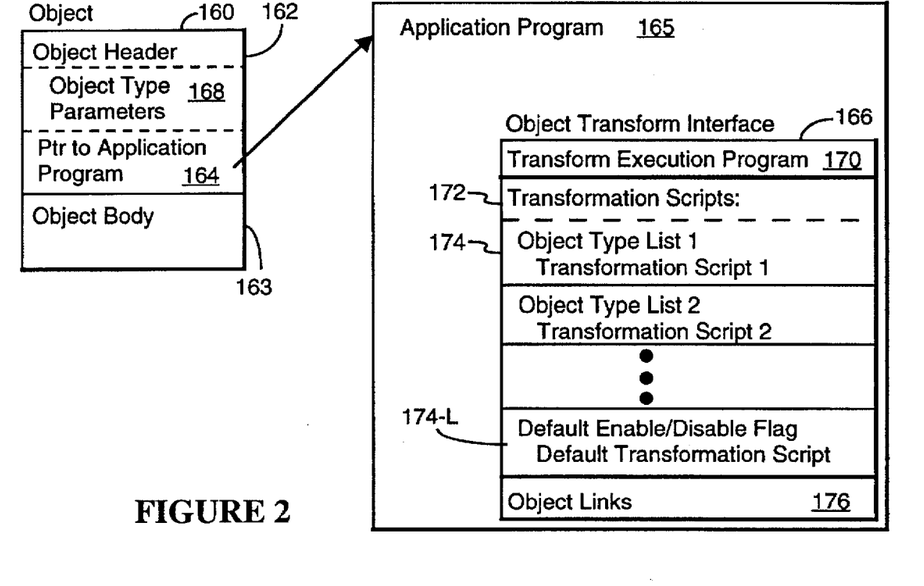
FIG. 2 is a block diagram of an object's data structure.

Referring to FIG. 2, each object 160 used in the computer system is a data structure. As is standard in many object oriented computer systems, each object includes a header 162, which may be accessible only to the operating system, and a body 163, which contains user definable data and software. The object header 162 includes a pointer 164 to the application program 165 that created the object 160.

The present invention adds a component, herein called the object transform interface or communication interface 166, to each application program 165. The object transform interface 166 can either be part of the application program of a separate software module linked to the application program. Each object can send and receive messages via the object transform interface 166 associated with the application program referenced in its header. Each object also preferably includes an object type parameter or set of parameters 168 that identify the object's type for purposes of performing object transformations.

In the preferred embodiment of the present invention every user accessible object has an associated object transform interface 166. In alternate embodiments it is possible that only those objects which will participate in the object transformation processes of the present invention will have an associated object transform interface 166, and thus some objects in such systems will not have an object transform interface.

The components of the object transform interface 166 are a program 170 for sending and receiving messages and for executing the object transformation process, and a set 172 of transformation scripts 174. Messages are transported between objects by the operating system, but the processing of those messages is handled by the respective object transform interfaces.

Each transformation script 174 includes a list 176 of transformee object types to which the script is applicable. In other words, a script 174 is used only if an object (called the transformee object) of a corresponding object type is being transformed by the application program 165 to which the script belongs. As shown in FIG. 2, the last script 174-L may be a default script that is used when the object type of the transformee object does not match the object types of the other scripts. The provision of a default transformation script for any particular object is optional.

The transform execution program 170 that handles the object transformation process both when the interface's object is the transformer object and when it is the transformee object in an object transformation. In many instances, program 170 will simply contain a procedure call to the application program 165 associated with the transformer object, where that procedure call includes any parameters required to direct the application program 165 to perform the user specified object transformation.

Finally, each object transform interface 166 includes an area 176 for storing links between objects, for the purpose of automatically routing data output by one object to the input of another object. Object linking is discussed below with reference to FIG. 8.

Preferred Mode of Initiation an Object Transformation

Figure 3:
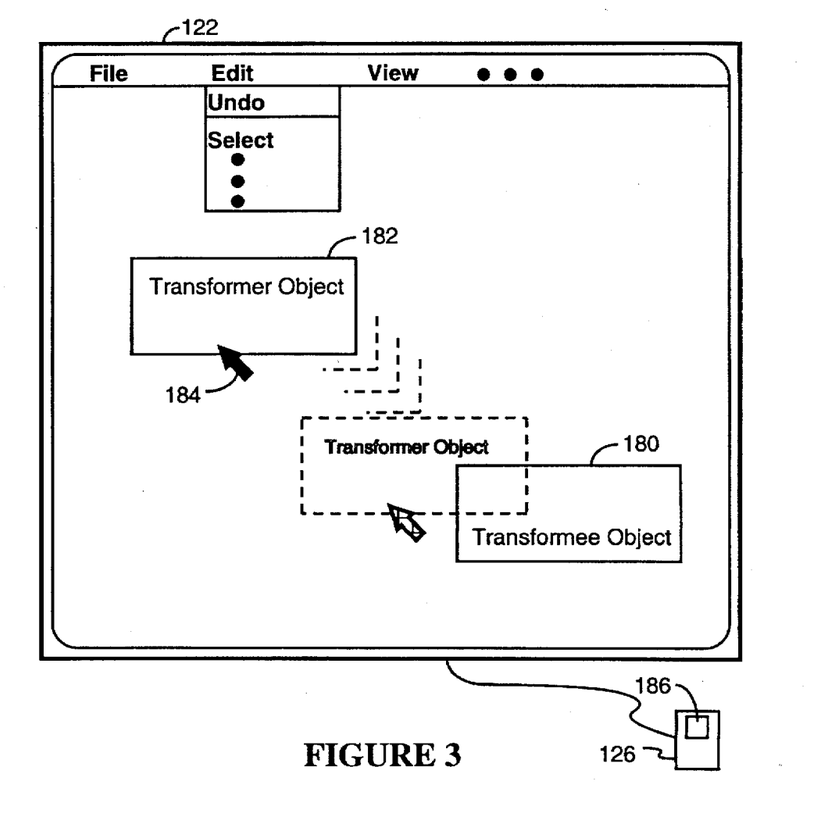
FIG. 3 is a conceptual representation of how a user "slaps" one object on top of another object to activate the object transformation process in a preferred embodiment of the present invention.

Referring to FIG. 3, there is shown a computer display 122 on which the images of two objects 180 and 182 are displayed. Consider the situation in which a user wants to modify the first object 180, herein called the transformee object, with the second object 182, herein called the transformer object. For instance, the object 180 to be modified may be a document, or a musical composition, or a set of data, and the transformer object 182 may be program that can be used to revise or modify the first object, or it may be a filter of some type. To initiate the transformation process the user selects the transformer object 182, for instance by using a mouse pointer device 126 to move a screen cursor 184 to overlap object 182 and then pressing down on a selection button 186 on the mouse device. Then, while still holding down the selection button 186, the user "slaps" the transformer object 182 on top of the transformee object 180 by dragging the transformer object 182 until it at least partially overlaps the transformee object 180 and then releasing the selection button 186. If the dragged object 182 overlaps another object when the selection button 186 is released, the object transformation process is activated.

Figure 4:
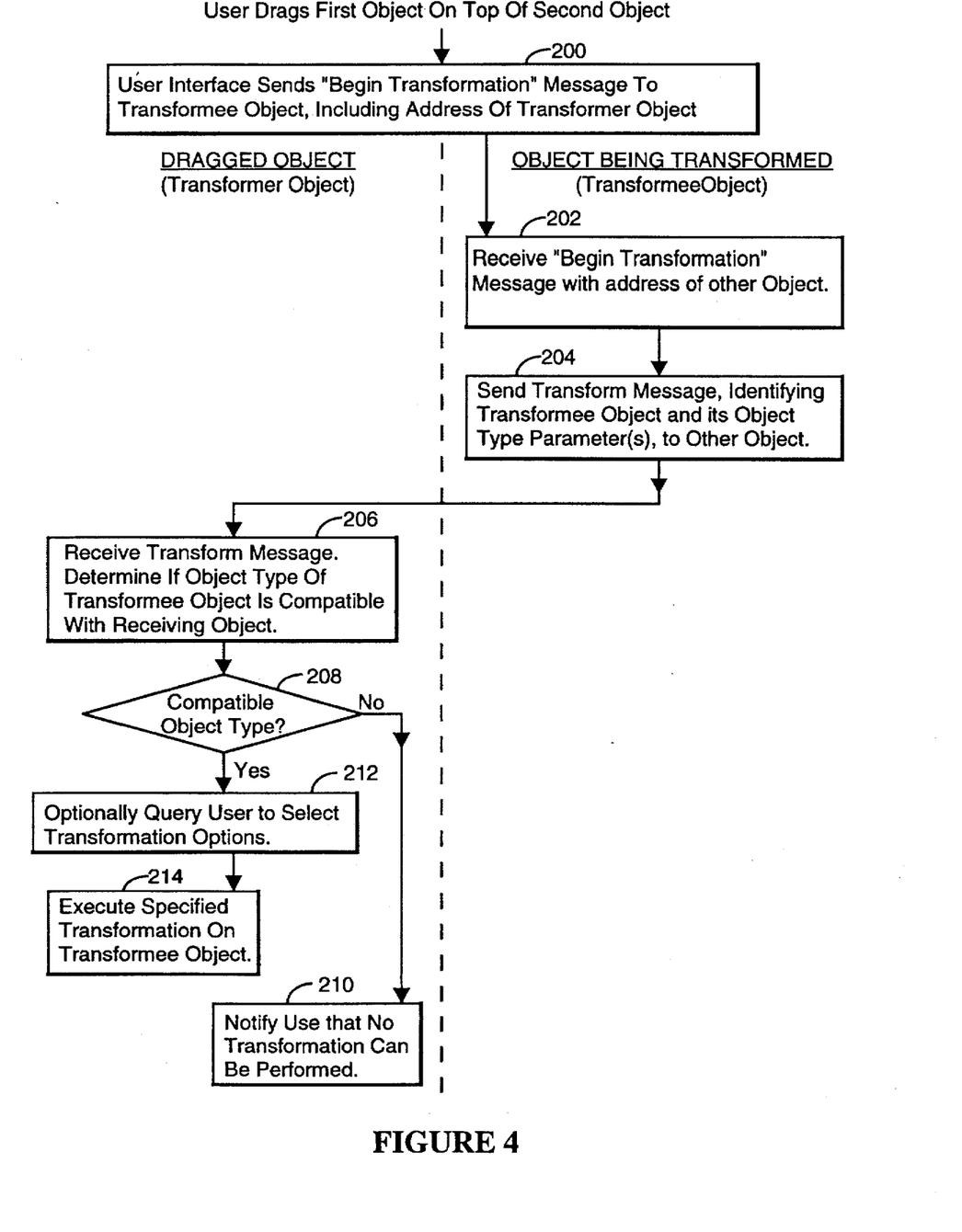
FIG. 4 is a flow chart representation of the object transformation process in a preferred embodiment of the present invention.

Referring to FIG. 4, the user interface support program of the computer system activates the object transformation process, in response to the user selecting the transformer and transformee objects, by sending a "begin transformation" message to the transformee object (step 200). The message to the transformee object includes as a parameter the address (or other identifier for sending messages) of the transformer object.

The transformee object receives the "begin transformation" message from the user interface (step 202) and then sends a "transform" message that identifies the transformee object and its object type parameters to the transformer object (step 204).

The transformer object receives the "transform" message sent by the transformee object, and compares the object type parameters in that message with the object type lists in the receiving object's transformation scripts 172 (see FIG. 2) to determine if any transformation script is compatible with the received object type parameters (step 206). If the transformee object is not of a compatible object type (step 208), then the user is notified that no transformation can be performed (step 210). Otherwise, the transformation process continues.

If the received object type parameters are compatible with two or more scripts, or if the compatible script includes a number of user selectable options, then the user is queried to select from among the available transformation options (step 212). Next, once the transformation process to be performed has been determined, the transformer object executes the selected transformation on the transformee object (step 214). Note that the actual task or tasks performed by the transformer object will vary considerably depending on the transformation to be performed. For example, the transformer object may process and revise data stored in the transformee object, or it may add data to the transformee object, or it may extract data and/or software from the transformee object and create a new object to encapsulate the extracted data and/or software. Many types of transformer objects can be utilized in the context of the present invention to perform useful tasks.

Examples of Object Transformations

Figure 5:
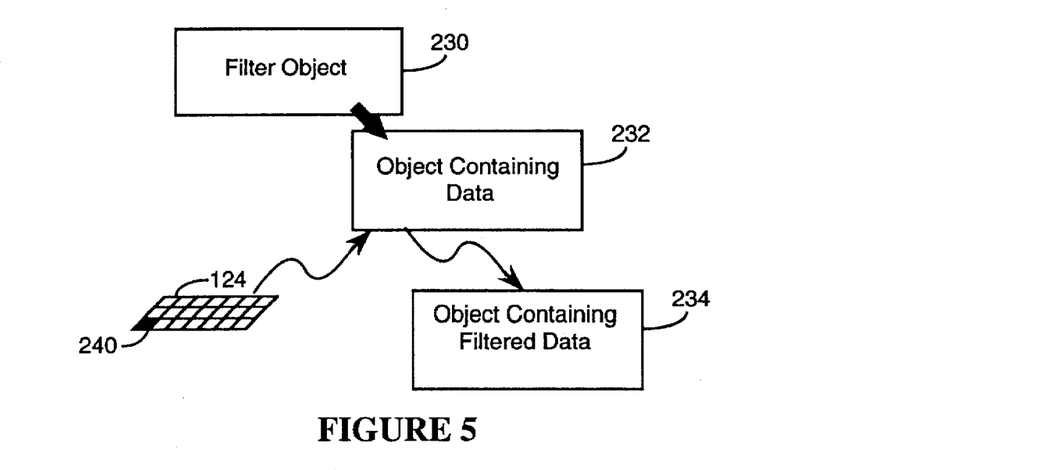
FIG. 5 is a conceptual representation of an object transformation process using a filter object to modify another object.

In the example shown in FIG. 5, the transformer object 230 is a data filter, which would typically be implemented by creating an object containing an appropriate mathematic function using an application program such as Mathematica. The transformee object 232 contains data that can be filtered. For instance, the transformee object 232 might contain a musical score and the transformer object 230 might contain a filter function that can be used to control the amplitude of different frequency components of the musical composition represented by musical score in transformee object 232. Alternately, the transformer object 230 may contain a computer program, created using a program such as Small Talk, that can be used to modify the musical score in object 232. For instance, a simple program containing one line of code:

event velocity: event pitch would cause the loudness (called velocity in the MIDI language used to control music synthesizers) of each musical note in the score to be modified so as to be proportional to its pitch.

The transformer object 230 is "slapped" onto the transformee object 232 by the user (i.e., the user drags the image of object 230 over the image of object 232 and releases the mouse select button), causing the transformation process to begin. The result of the transformation process will be an object 234 containing filtered data. The resulting object 234 may either be a new object or it may be a revised version of the transformee object 232. In the preferred embodiment, the user determines whether the transformation process creates a new object or revises the transformee object by pressing or not pressing an "option" key 240 on the computer system's keyboard 124, respectively.

Figure 6:
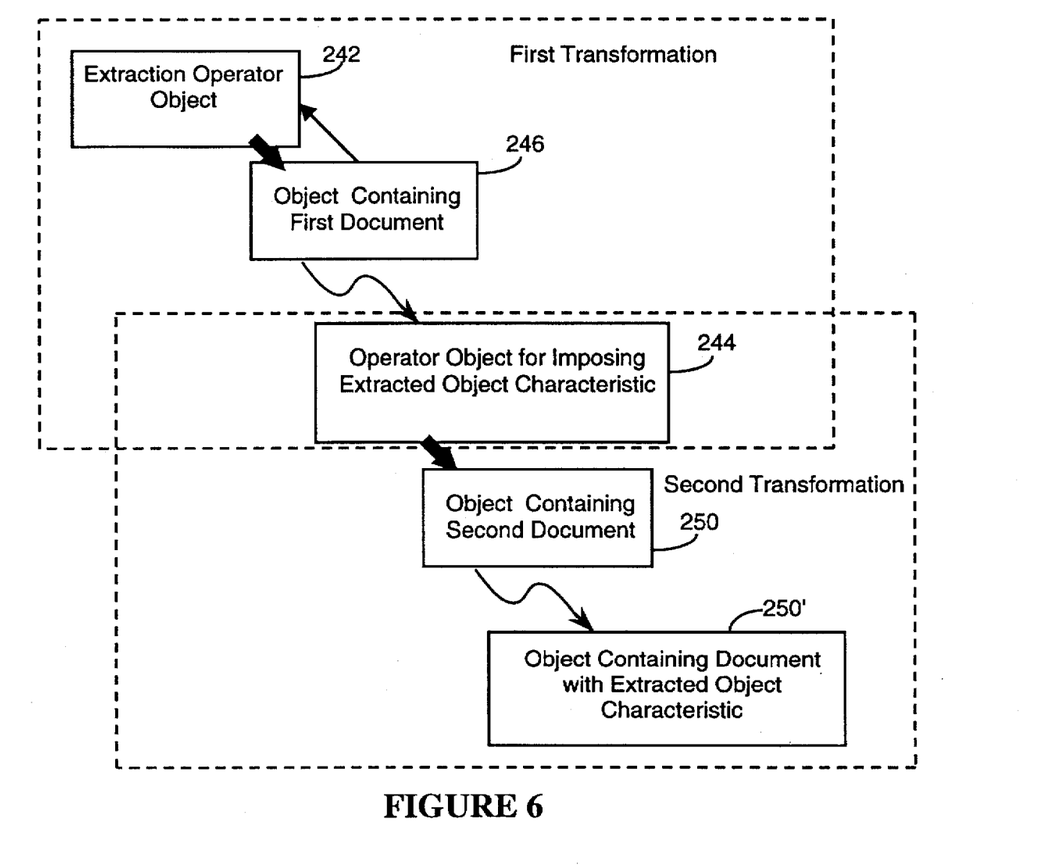
FIG. 6 is a conceptual representation of an object transformation process using an extraction object to create an operator object from an object having a desired object characteristic, and then using the operator object to modify another object.

In the example shown in FIG. 6, in a first object transformation, a first object operator 242 is used to create another object operator 244 by "extracting" a desired characteristic or set of characteristics from an object 246 that contains an example of something the user would like to replicate in other objects. For instance, operator object 242 might contain software for extracting the "style" of any specified document. By "slapping" this operator object 242 on an object 246 that contains a document, a new operator object 244 is created that can used to reformat other documents with the extracted style.

The second object transformation shown in FIG. 6 begins when the new operator object 244 is "slapped" on a different object 250 that contains a document, thereby causing a transformation of object 250 into a revised object 250' that contains a revised document incorporating the style of the document in object 246.

It is noted that software for extracting and generating a representation of a document's style, or for extracting and generating a representation of a musical composition's rhythm are known to those skilled in the art. What the present invention adds to that prior art is a method of utilizing such software in a way that is convenient and intuitive to non-technical computer users.

This paradigm of using operator objects to create new operator objects can be utilized in many ways, and provides a very intuitive method for transforming one object to make it more like another object. For instance, a first object transformation could be used to extract the rhythm of a first musical composition (contained in a first musical score object), and to create an operator object for imposing that rhythm on other musical compositions.

To take advantage of this method of using the present invention, it is anticipated that a new "object macro" capability will be added to most application programs used in conjunction with the present invention. The object macro capability may be implemented by providing a "make operator object" command in the application program to produce an operator object that performs a function specified by appropriate selection of menu options in the application program, much like a macro.

Figure 7:
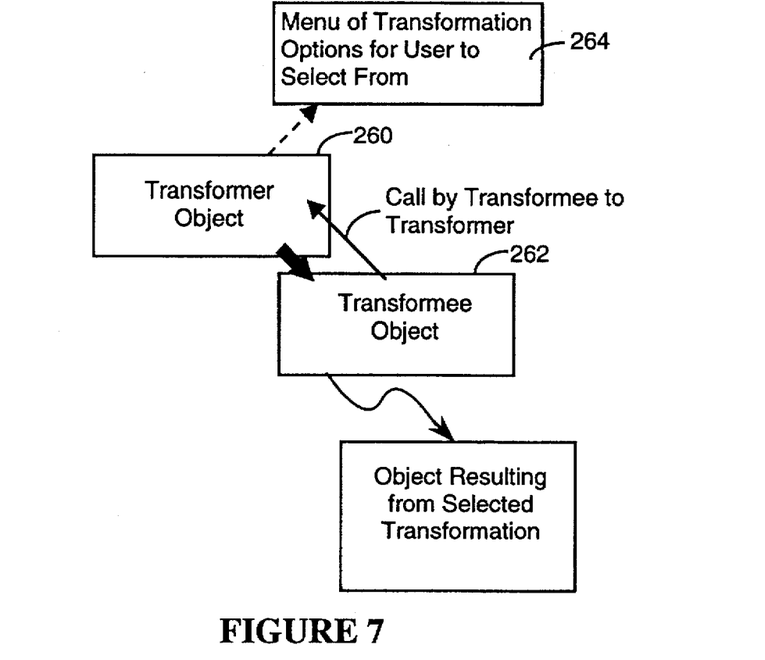
FIG. 7 is a conceptual representation of an object transformation process in which the user is presented with a menu of object transformation options.

FIG. 7 is an example of an object transformation in which the user is presented with a menu of transformation options. This situation arises in a number of contexts. For instance, the transformer object 260 may be an application program that can perform many different transformations on any given object 262, and thus the user will need to select the transformation to be performed from a menu 264. In such instances, the menu 264 of options will be generated by the transformer object.

In other situations, the transformation script of the transformee object may include software for generating a menu of options. For instance, the script may request the user to specify the portion of the transformee object to be transformed, or may request the user to specify which parameter or parameters of data stored in the transformee object are to be transformed. In these instances, the menu of options will be generated by the transformee object.

Figure 8:
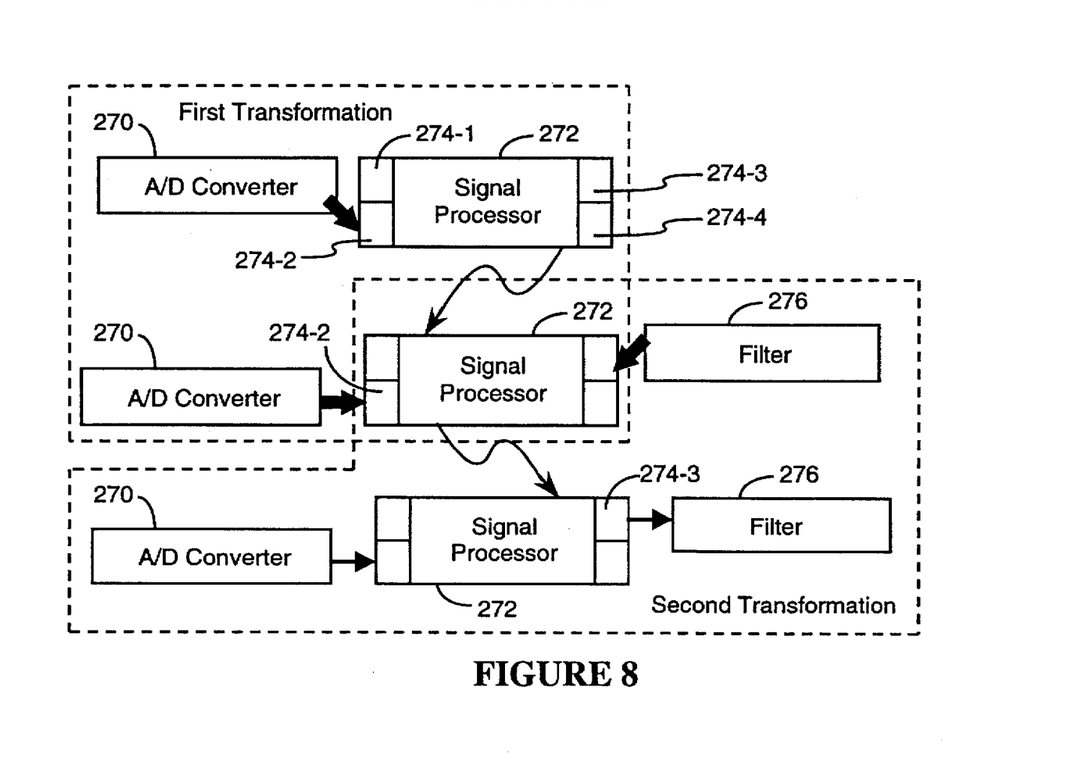
FIG. 8 is a conceptual representation of an object transformation process in which durable links are formed between objects that execute distinct application programs.

FIG. 8 shows an example of performing object transformations for the purpose of linking two or more objects 270, 272, 274 so that those objects will work together as though they were a single object. The linked objects are typically application program objects that may or may not have been specifically written to work with one another. This type of "linking object transformation" is typically invoked whenever a first program object 270 is used to transform a second program object 272, and the second program object 272 has at least one defined input/output port 274 to which the first program object 270 can be linked.

The purpose of the object linking process is to cause data flowing through one object to be automatically routed to another object for further processing.

In the example shown in FIG. 8, the first program object 270 is an analog-to-digital data converter (A/D Converter) object 270, and the second program object 272 is a signal processor object 272. The signal processor object 272 is shown as having four input/output ports 274-1 through 274-4. To initiate the object transformation the user "slaps" the A/D converter object 270 onto the signal processor object 272. If object 272 has only one input signal port, then the A/D converter object 270 would be automatically linked by the transform execution program of the A/D converter object 270 to that port. Otherwise, the user will be requested by the A/D converter object's transform execution program 175 (see FIG. 2) to select the input port of the signal processor object 272 to which the A/D converter object should be linked. In the example in FIG. 8, the result of the object linking process is the linking of the A/D converter object 270 to port 274-2 of the signal processor object 272.

A second object transformation shown in FIG. 8 is initiated by "slapping" filter object 276 onto signal processor object 272, causing filter object 276 to be linked to output port 274-3 of the signal processor object. Links between objects are stored as "program links 176" (see FIG. 2) as part of the transform execution interface of the corresonding application programs. The resulting linked objects 270, 272 and 276 will operate together so that data flowing into the A/D converter object 270 will be directed to the signal processor 272 after conversion by object 270, and so that data output by the signal processor 272 is directed to the input of filter object 276.

Figure 9:
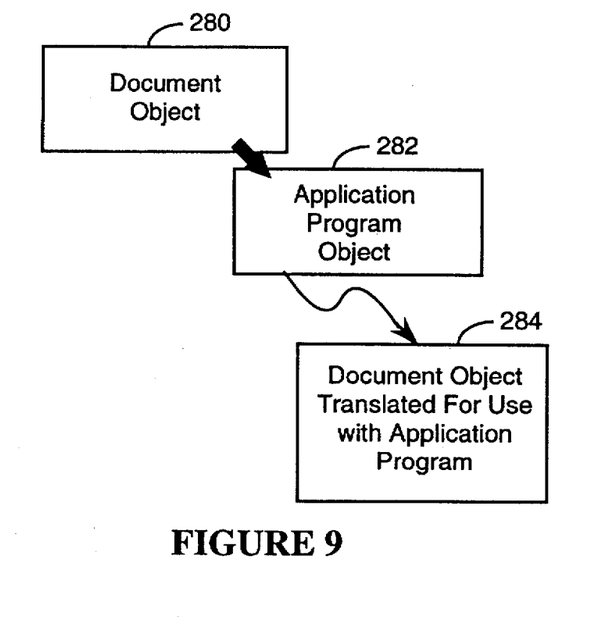
FIG. 9 is a conceptual representation of an object transformation process in which a document object or other data object is used to transform an application program object.

While the examples of object transformations discussed above have primarily involved using an application program object to modify data type objects, the opposite type of object transformation is also useful. FIG. 9 shows an example of a document or data type object 280 being "slapped" onto an application program object 282. In this example the application program object 282 is "transformed" only in that the document in object 280 is imported into the program, which may cause the document to be converted or translated into the program's internal format, which will generally result in a modified document object 284 being created. This use of the present invention produces essentially the same result as the "drag and drop" server discussed in the background of the invention section of this document. This example is presented to show that the "data conversions" accomplished by prior systems are but a small subset of the object transformations achieved by the present invention. Furthermore, the present invention accomplishes such data conversions in a different manner than the drag and drop server or the clipboard servers discussed above in that each object involved in the transformation includes a program or process component (herein called the object transform interface) that engages in an exchange of messages in order to determine the exact nature of the transformation to be performed. By using this object transform interface mechanism, both data conversions and other types of object conversions can be performed in a manner that is both easy for users to perform and intuitive in terms of the results produced.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

In particular, it is important to note that in other embodiments of the present invention, the roles of the first and second objects selected by the user may be reversed so that first object selected is the transformee and the second object is the transformer. That is merely a choice as to which sequence of user actions is most likely to be intuitive and easy to learn. Similarly, the object to send the first message to the other object may be the first object selected, or it may be the transformer object rather than the transformee object. The number of messages that need to be sent back and forth between the objects involved in a transformation may vary from implementation to implementation. In addition, the object transform interface will vary considerably from implementation to implementation. These types of variations in the manner in which the present invention is implemented do not affect the basic principles of operation of the present invention.

What is claimed is:

1. A computer system, comprising:

a memory for storing data and data structures;

a user interface that includes a display for displaying images and input apparatus for enabling a user to enter commands and to move the displayed images;

a multiplicity of objects comprising data structures stored in said memory means, each object having an associated image that can be displayed on said display and an associated object type parameter that identifies an object type associated with the object;

said user interface including means for responding to user commands, said user interface including means for selecting a first one of said multiplicity of objects as a transformer object and for selecting a second one of said multiplicity of objects as a transformee object;

means for exchanging messages, including object identifying messages, between said selected transformer and transformee objects, wherein said means for exchanging messages sends at least one message from said selected transformer object to said selected transformee object and sends at least one message from said selected transformee object to said transformer object each time said user selects a transformer object and a transformee object;

means for automatically determining, based on said object type of said selected transformee object, a transformation action to be performed on said selected transformee object; and means for automatically initiating performance of said object type based transformation action on said selected transformee object so as to generate a transformed object that contains information derived from at least one said selected transformer object and said selected transformee object;

wherein said system includes a plurality of transformer objects available for user selection, at least one transformer object having associated therewith at least two distinct transformation actions to be performed on transformee objects of different respective object types.

2. The computer system of claim 1, including a plurality of application programs, said means for exchanging messages including a communication interface associated with each application program for sending and receiving messages to and from objects created by said each application program.

3. The computer system of claim 2, wherein said communication interface of each application program includes said means for determining said transformation actions to be performed.

4. The computer system of claim 1, wherein said means for selecting comprises means for enabling a user of said computer system to select on said display an object image corresponding to an object to be used as said transformer object, for moving the selected object image on top of another object's image, where said other object image corresponds to an object to be used as said transformee object.

5. The computer system of claim 1, including a plurality of application programs, said application programs including means for performing said transformation actions, including means for leaving said transformee object unchanged and creating a new object produced by performance of said transformation actions on said transformee object.

6. The computer system of claim 1, wherein said transformee object includes at least one input/output port;

said system including means for linking said transformer object to a selected input/output port of said transformee object so that data flowing through said selected input/output port of said transformee object is automatically thereafter routed through said transformer object.

7. In a computer system that includes a memory for storing a multiplicity of objects, each object having an object type parameter that assigns an object type to the object, a display for displaying images representing a subset of said multiplicity of objects, and input apparatus for enabling a user to enter commands and to move the displayed images; a method of transforming selected objects with another selected object, the steps of the method performed by said computer system comprising:

enabling a user of said computer system to initiate an object transformation by selecting on said display a first object's image, and to move the selected object image on top of a second object's image; wherein said first object's image and second object's image correspond to first and second objects in said multiplicity of objects;

said first and second objects responding to said movement of said first object's image on top of said second object's image by exchanging messages including sending at least one message from said first object to said second object and sending at least one message from said second object to said first object; wherein at least one of said messages sent by one of said first and second objects to the other of said first and second objects identifies said one object and said one object's assigned object type;

said other object responding to said sent message by automatically selecting, based on said one object's identified object type, one of a plurality of predefined transformation actions to be performed on said one object; and then automatically, after said transformation selecting step, performing said selected object type based transformation action on said one object so as to produce a transformed object that contains information derived from at least one of said one object and said other object.

8. The computer system of claim 1, including a plurality of executable scripts associated with said transformer object, each script having associated therewith a set of transformee object types to which said script is applicable; and means for executing one of said plurality of scripts associated with said transformer object when said object type of said selected transformee object matches the set of transformee object types associated with said one of said plurality of scripts.

9. The method of claim 7, including providing a plurality of executable scripts associated with said other object, each script having associated therewith a set of object types to which said script is applicable; and executing one of said plurality of scripts associated with said other object when said object type of said one object matches the set of object types associated with said one of said plurality of scripts.

10. A computer system, comprising:

a memory for storing data and data structures;

a user interface that includes a display for displaying images and input apparatus for enabling a user to enter commands and to move the displayed images;

a multiplicity of objects comprising data structures stored in said memory means, each object having an associated image that can be displayed on said display and an associated object type parameter that identifies an object type associated with the object;

said user interface including means for responding to user commands, said user interface including means for selecting a first one of said multiplicity of objects as a transformer object and for selecting a second one of said multiplicity of objects as a transformee object;

means for exchanging messages, including object identifying messages, between said selected transformer and transformee objects, wherein said means for exchanging messages sends at least one message from said selected transformee object to said transformer object each time said user selects a transformer object and a transformee object; and a plurality of executable scripts associated with said transformer object, each script having associated therewith a set of object types to which said script is applicable;

means for automatically executing one of said plurality of scripts associated with said transformer object when said object type of said selected transformee object matches the set of object types associated with said one of said plurality of scripts so as to automatically generate a transformed object that contains information derived from at least one of said selected transformer object and said selected transformee object.

11. In a computer system that includes a memory for storing a multiplicity of objects, each object having an object type parameter that assigns an object type to the object, a display for displaying images representing a subset of said multiplicity of objects, and input apparatus for enabling a user to enter commands and to move the displayed images; a method of transforming selected objects with another selected object, the steps of the method performed by said computer system comprising:

enabling a user of said computer system to initiate an object transformation by selecting on said display a first object's image, and to move the selected first object's image on top of a second object's image; wherein said first object's image and second object's image correspond to first and second objects in said multiplicity of objects;

sending at least one message from one of said first and second objects to the other of said first and second objects, wherein said at least one message identifies said one object and said one object's assigned object type;

providing a plurality of executable scripts associated with said other object, each script having associated therewith a set of object types to which said script is applicable; and automatically executing one of said plurality of scripts associated with said other object when said object type of said one object matches the set of object types associated with said one of said plurality of scripts so as to automatically generate a transformed object that contains information derived from at least one of said one object and said other object.

* * * * *